United States Patent

[11] 3,581,555

[72] Inventor Edwin L. Cline
  Pasadena, Calif.
[21] Appl. No. 492,473
[22] Filed Oct. 4, 1965
[45] Patented June 1, 1971
[73] Assignee Clayton Manufacturing Company
  El Monte, Calif.

[54] APPARATUS AND METHOD FOR ANALYZING ENGINE EXHAUST GAS
  20 Claims, 18 Drawing Figs.
[52] U.S. Cl. .................................................. 73/27,
  23/232E, 23/255E
[51] Int. Cl. .................................................. G01n 25/18,
  G01n 31/00, G01n 33/22
[50] Field of Search .......................................... 23/232 (E),
  254 (E), 255 (E), 255, 232 (VS); 73/27, 25, 26,
  116

[56] References Cited
UNITED STATES PATENTS

| | | | |
|---|---|---|---|
| 2,591,759 | 4/1952 | Zaikowsky | 23/255EX |
| 3,088,310 | 5/1963 | Penn et al. | 73/27 |
| 2,053,121 | 9/1936 | Vayda | 23/255E |
| 2,057,246 | 10/1936 | Morgan et al. | 23/232E |
| 2,298,288 | 10/1942 | Gerrish et al. | 23/255E |
| 2,921,841 | 1/1960 | Gerrish | 23/232E |

Primary Examiner—Joseph Scovronek
Assistant Examiner—Joseph Scovronek
Attorney—Bacon & Thomas ABSTRACT: A method and apparatus for analyzing engine exhaust or other gas wherein the gas is continuously collected and mixed with a predetermined volume of water to cool the gas to a uniform temperature and to wash contaminants therefrom, and wherein the mixture is centrifuged and the thus treated gas is caused to flow in a continuous stream to a gas analyzer containing a heated filament for measurement of the thermal conductivity of the gas.

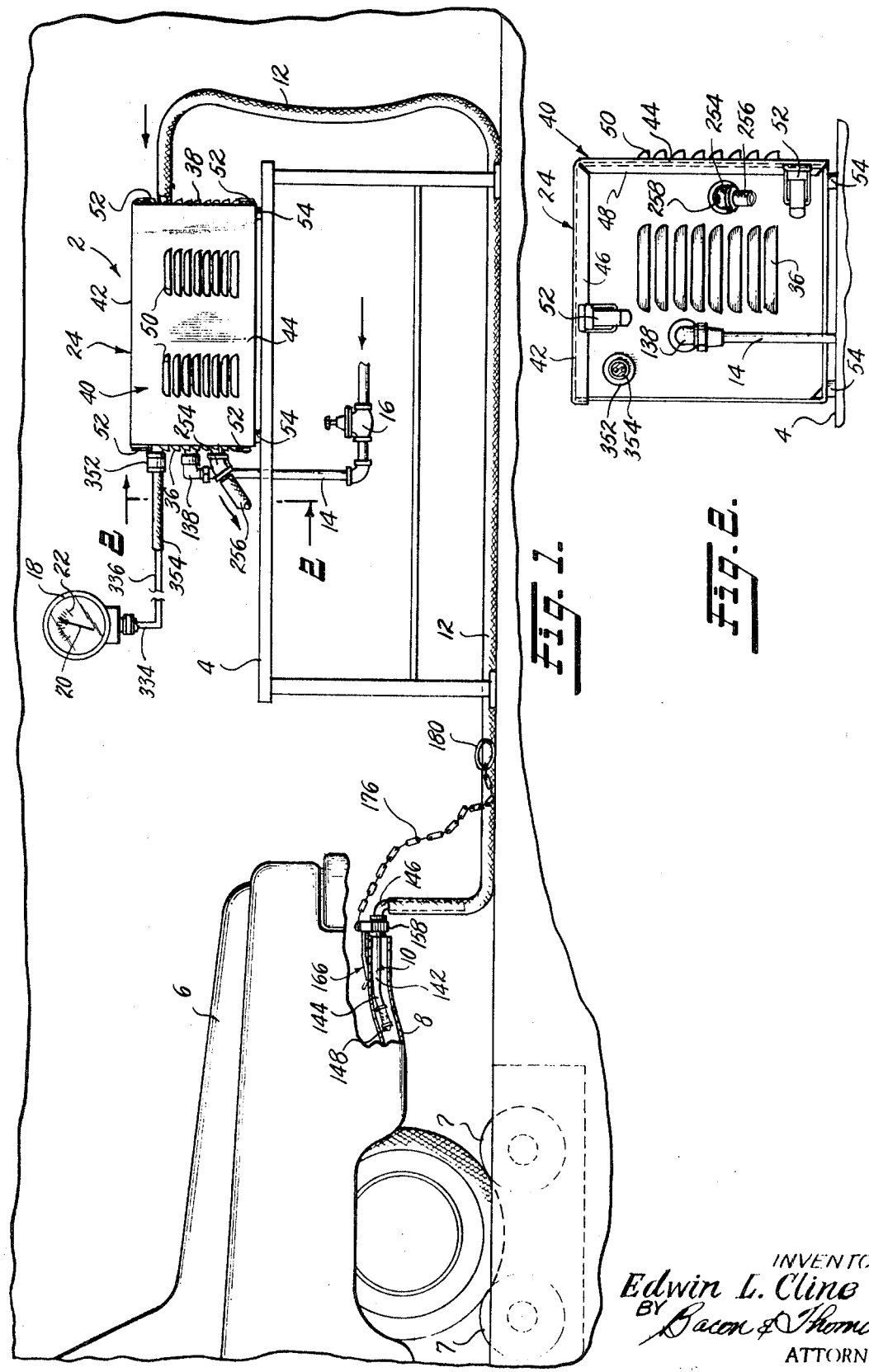

INVENTOR
Edwin L. Cline
BY
Bacon & Thomas
ATTORNEYS

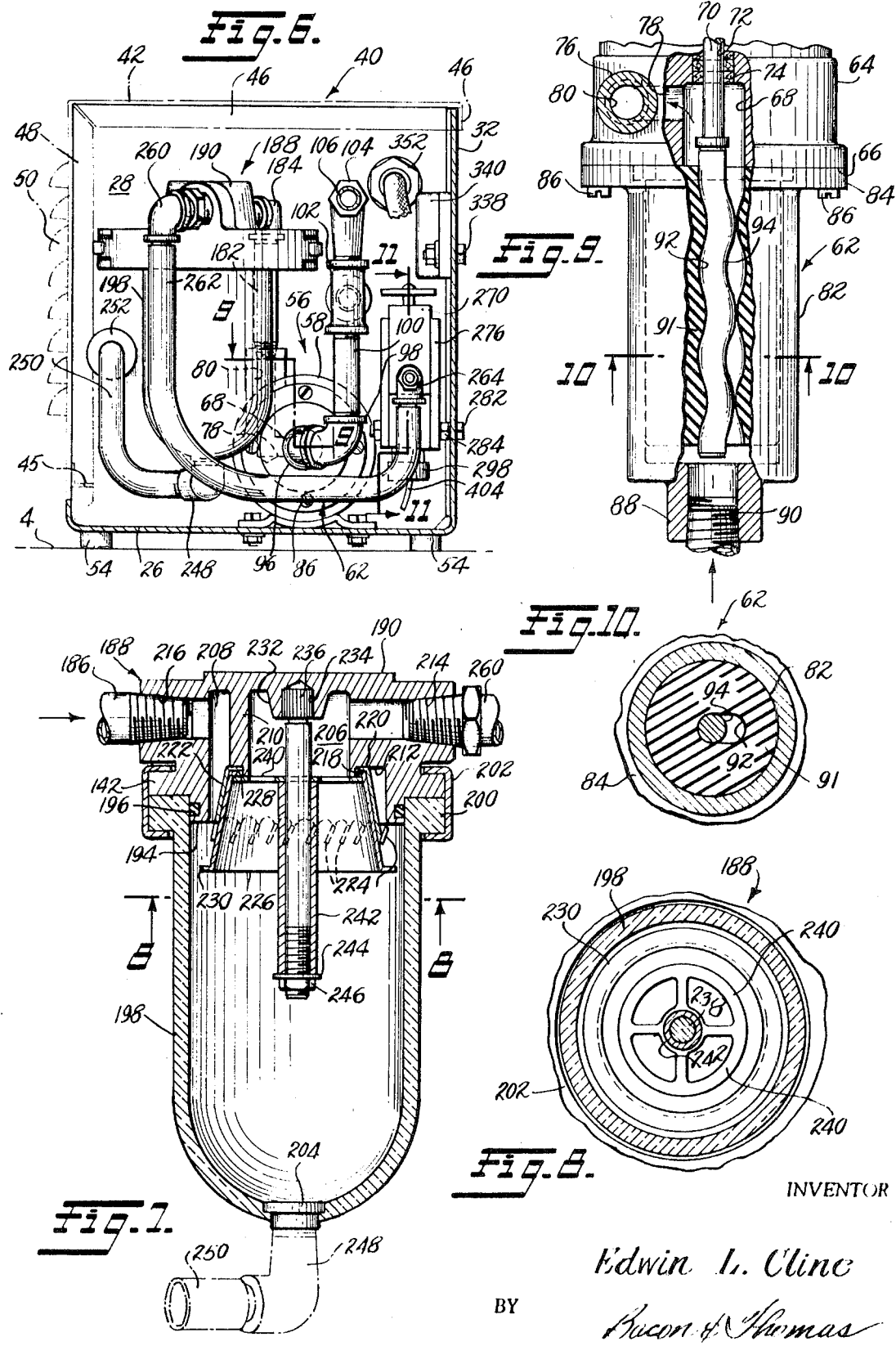

INVENTOR
Edwin L. Cline
BY Bacon & Thomas
ATTORNEYS

INVENTOR
Edwin L. Cline

BY Bacon & Thomas
ATTORNEYS

APPARATUS AND METHOD FOR ANALYZING ENGINE EXHAUST GAS

This invention relates generally to the art of internal combustion engine exhaust gas analysis, and more particularly to an apparatus and method for continuously analyzing exhaust gas while the engine is in operation to determine the combustion mixture being supplied through the fuel-air system at various engine speeds and loads, to ascertain the need, if any, for system adjustment or overhaul to restore the engine to optimum operation.

The carburetion of an internal combustion engine is designed to supply a mixture of air and fuel to the several cylinders of an engine, wherein the mixture is compressed, ignited and burned to produce power, and then exhausted. The operating efficiency of an engine is determined largely by the characteristics of the air-fuel mixture supplied thereto, and in particular by the ratio of air-to-fuel. Each level of demand for power output from an engine will normally have an optimum air-to-fuel ratio, and the engine carburetor usually is constructed to automatically adjust the air-to-fuel ratio to the power output demand placed on the engine. In the case of an automobile engine, for example, the engine carburetor should be capable of adjusting the air-to-fuel ratio of the mixture to meet the varying demands placed on the engine for the operating conditions of idle, acceleration, and cruising with a minimum of unburned hydrocarbons in the exhaust gases.

The performance of an automobile engine is thus largely determined by the capability of the carburetor to function for supplying air and fuel in the proper proportions to satisfy the varying engine-operating conditions. Thus, by measuring the air-to-fuel ratio of a carburetor mixture, it is possible to evaluate engine performance, and to determine the need, if any, to clean, adjust or repair the carburetor.

The air-to-fuel ratio of the mixture supplied by the carburetor can be determined by analysis of the engine exhaust gas. The thermal conductivity of engine exhaust gas bears a definite, known relationship to the air-to-fuel ratio, and hence by measuring the thermal conductivity of the exhaust gas it is possible to determine the corresponding air-to-fuel ratio.

The present invention embodies substantial improvements over prior exhaust gas, air-to-fuel ratio analyzers, which have not proved to be entirely satisfactory for numerous reasons, including the inability to compensate for the effect of variations in exhaust gas temperatures and rates of flow, their ready susceptibility to becoming quickly contaminated by carbon particles and requiring frequent servicing and cleaning, etc., with consequent unreliability of their readings.

The present method and apparatus avoid the difficulties found with such prior devices, in that said method and apparatus continuously precondition the exhaust gas prior to testing to avoid variations in air-to-fuel ratio readings by maintaining the exhaust gas at a substantially uniform temperature, removing contaminants therefrom and supplying the cooled, clean gas at a continuous uniform rate to a sensitive test cell which continuously measures the thermal conductivity thereof while passing through the cell.

More particularly, the present apparatus comprises a positive displacement pump which proportionately mixes water with the engine exhaust gas in a manner to wash the exhaust gas and thus reduce its temperature, and to entrain any foreign particles present in the gas. The mixture of water and exhaust gas is then passed through a centrifugal separator, which separates the gas from the water and contaminants entrained therein, and delivers the cooled and clean gas at a substantially uniform rate and pressure to a test cell of an exhaust-gas-analyzing unit which measures its thermal conductivity.

The thermal conductivity is measured by passing the exhaust gas over a heated or glowing electrical resistance element. The exhaust gas will conduct heat away from the element at a rate corresponding to the thermal conductivity of the gas, and the rate of heat conduction will determine the operating temperature of the glowing element. Since the value of the electrical resistance will vary in a known manner with its temperature, by measuring the value of such resistance as the exhaust gas is passed thereover, it is possible to determine the thermal conductivity of the exhaust gas and hence the air-to-fuel ratio of the original carburetor mixture.

The principal object of the invention is to provide a method and apparatus for analyzing engine exhaust gas to accurately determine the air-to-fuel ratio of the carburetor mixture from the thermal conductivity of the exhaust gas.

Another and important object is to provide a method and apparatus for pretreating engine exhaust gas to place the same in optimum condition for testing to determine its original air-to-fuel ratio.

A further object is to provide a method and apparatus for continuously analyzing engine exhaust gas, wherein the life and accuracy of the analyzing unit is prolonged indefinitely, and servicing requirements are reduced to a minimum.

Still another object is to provide a simple and reliable exhaust gas analyzer that can be routinely operated on an intermittent or continuous basis by a relatively unskilled operator, and which will quickly and accurately indicate the air-to-fuel ratio of a carburetor mixture.

A still further object is to provide a method and means for continuously determining the air-to-fuel ratio of a carburetor mixture on the engine of a vehicle while subject to different road speeds and loads simulated by a chassis dynamometer.

Other objects and many of the attendant advantages of the present invention will become readily apparent from the following detailed description, when taken in connection with the accompanying drawings, wherein:

FIG. 1 is a fragmentary side elevational view, partly in cross section of vehicle testing apparatus incorporating the exhaust gas analyzer unit of the present invention;

FIG. 2 is a left end elevational view of the exhaust gas analyzer unit, as viewed on the line 2–2 of FIG. 1;

FIG. 6 is a vertical sectional view, taken on the line 6–6 of FIG. 3, with the cover for the exhaust gas analyzer unit shown in phantom lines;

FIG. 7 is an enlarged vertical sectional view through the liquid-gas separator of the exhaust gas analyzer, taken on the line 7–7 of FIG. 3;

FIG. 8 is a fragmentary horizontal sectional view, taken on the line 8–8 of FIG. 7;

FIG. 9 is an enlarged fragmentary horizontal sectional view through the positive displacement mixing pump of the exhaust gas analyzer, taken on the staggered line 9–9 of FIG. 6;

FIG. 10 is a fragmentary vertical sectional view, taken on the line 10–10 of FIG. 9;

Figure 3:
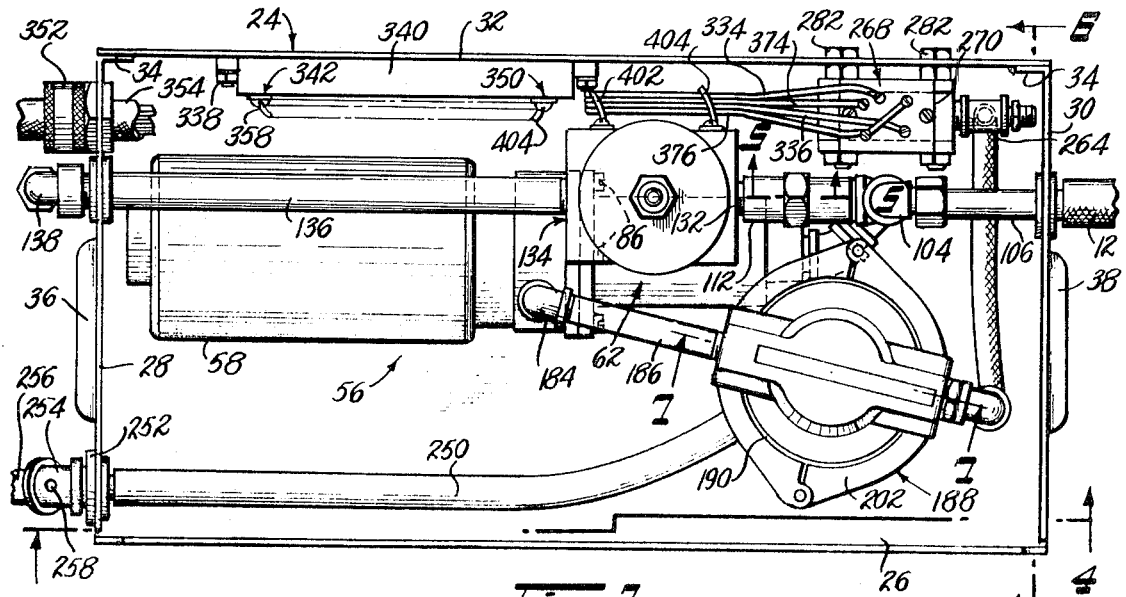
FIG. 3 is an enlarged plan view of the exhaust gas analyzer unit of FIG. 1 with the housing cover removed and showing the arrangement of the components in said housing.

Referring now to FIG. 1 of the drawings, the exhaust gas analyzer unit is generally indicated at 2, and is shown resting upon a table 4. An automobile is indicated at 6, with its rear wheels resting upon rolls 7 of a conventional chassis dynamometer. The vehicle has an engine exhaust gas or tailpipe 8, through which exhaust gas from the automobile engine (not shown) passes. Detachably secured within the open end of the tailpipe 8 is an exhaust gas sampling gun or gas collector probe 10, to which is connected a hose 12. The hose 12 extends to the exhaust gas analyzer unit 2, and continuously supplies exhaust gas thereto during a test. As will be explained, the exhaust gas is mixed with water within the unit 2, such water being supplied through a pipe 14 having a manual shutoff valve 16 therein.

Figure 13:
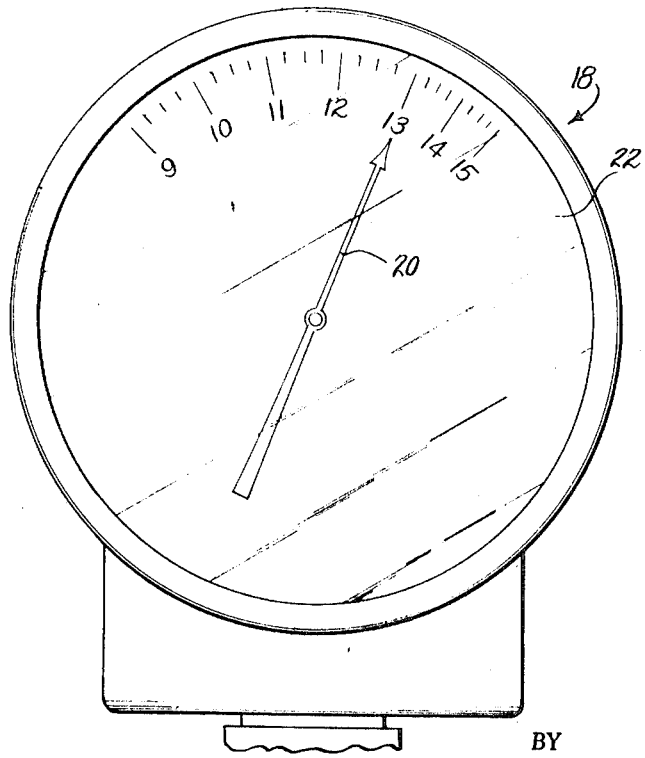
FIG. 13 is an enlarged face view of the meter used with the exhaust gas analyzer to visually indicate the air-to-fuel ratio of the engine carburetor mixture.

The exhaust gas analyzer unit 2 functions to continuously measure the thermal conductivity of the exhaust gas passing therethrough, which thermal conductivity, as has been explained, bears a definite relationship to the air-to-fuel ratio of the engine carburetor mixture. In this invention, thermal conductivity of the exhaust gas is measured by a unique wheatstone bridge arrangement, and an electrical signal corresponding to the value of the thermal conductivity (and hence to the air-to-fuel ratio) is transmitted to a meter 18. The meter 18 includes a pointer 20 arranged to move over a scale 22, calibrated to directly indicate the air-to-fuel ratio, as shown in FIG. 13. Specifically, the scale 22 is calibrated with numerical values from 9 through 15, the numbers representing the value of the air-to-fuel ratio for the carburetion mixture of the exhaust gas sample then being analyzed.

The exhaust gas analyzer unit 2 includes a housing or box 24, FIGS. 1 to 4 and 6, which has a bottom wall 26 with a pair of end walls 28 and 30, and a back wall 32 formed integrally therewith. The end walls 28 and 30 have inturned flanges 34 on their vertical rear edges, which are welded to the inner side of the backwall 32. The end walls 28 and 30 also have a plurality of horizontal, downwardly opening ventilating louvers 36 and 38, respectively, formed therein. The housing 24 further includes a cover 40, comprising a top wall 42 and a front wall 44, the front wall 44 being integral with the top wall 42 and having a reinforcing angle iron 45 (FIG. 6) secured to its inner surface near the bottom edge thereof. Flanges 46 on the free edges of the top wall 42 are received over the upper edges of the backwall 32 and the end walls 28 and 30. Similarly, the front wall 44 has flanges 48 on its vertical side edges, which are received over the front vertical edges of the end walls 28 and 30. The front wall 44 has two sets of downwardly facing ventilating louvers 50 formed therein, which cooperate with the louvers 36 and 38 to provide air circulation through the housing 24. The cover 40 is removably secured in position by suitable latches 52. The bottom wall 26 has foot pads 54 at each of its corners.

Mounted within the housing 24 is a liquid-gas mixing pump unit 56, which includes an electric motor 58 secured to the bottom wall 26 by bolts 60. A positive displacement pump 62 is mounted on the motor 58, as is best shown in FIGS. 3 and 4.

The pump 62 has an outlet section 64, FIG. 9, secured directly to the front face of the motor 58 and terminates in a flat end face 66. The outlet section 64 has a large chamber 68, which opens centrally on the end face 66. A pump shaft 70 extends into the chamber 68 through an axial opening 72 in the outlet section 64, and is connected to the output shaft (not shown) of the electric motor 58. Suitable seals 74 prevent the passage of liquid and gas from the chamber 68 along the shaft 70 to the motor 58. The outlet section 64 has a boss 76 through which extends a threaded passage 78 leading from the outlet chamber 68 and constituting the outlet port of the pump 62.

A cylindrical housing section 82 has a flange 84 on the rear end thereof, which is connected to the end face 66 by screws 86. The forward end of the housing 82 has a boss 88 through which extends a threaded axial inlet port 90. The housing 82 is hollow, and has mounted therein a stator 91. Extending axially through the stator 91 from the inlet port 90 to the outlet chamber 68 is a pump chamber or cavity 92, which has the configuration of a double internal helical thread. A rotor 94, connected at the inner end thereof to the pump shaft 70, extends through the pump cavity 92 and has an external helical thread thereon.

Figure 4:
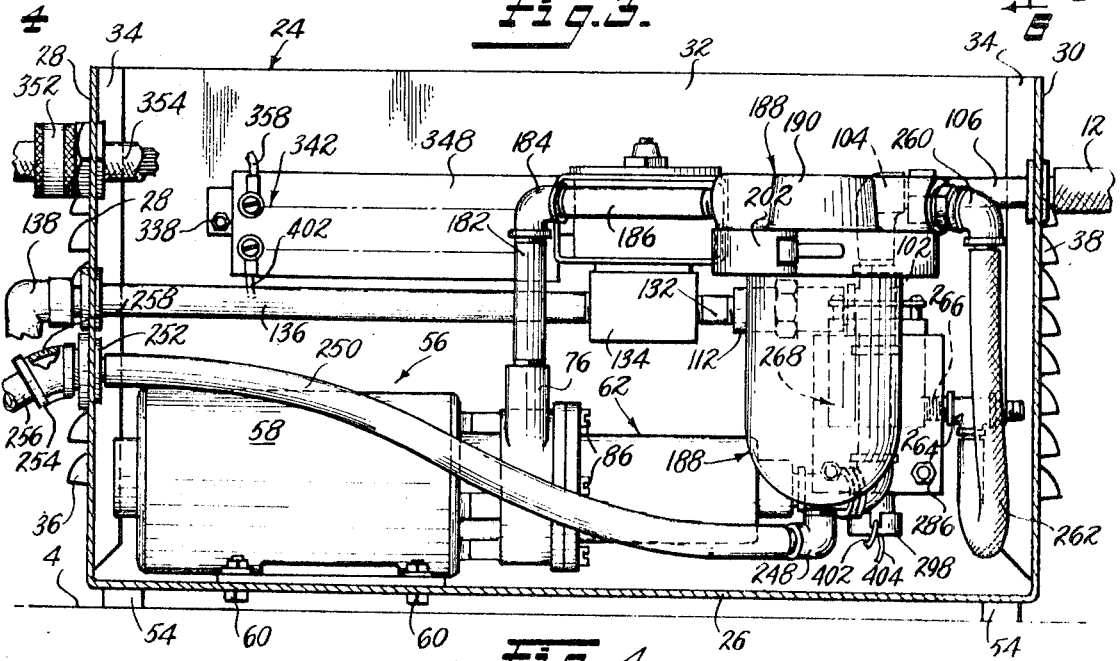
FIG. 4 is a vertical sectional view, taken on the line 4–4 of FIG. 3.

The inlet port 90 of the pump 62 has a pair of elbows 96 and 98, FIGS. 3 and 6, connected thereto, the elbow 98 opening upwardly and having the lower end of a pipe nipple 100 secured therein. One end of a pipe-T 102 is connected to the upper end of the nipple 100. An elbow 104 is connected to the upper end of the pipe-T 102, and a horizontal nipple 106 extends from said elbow 104 through an opening in the housing end wall 30. The outer end of the nipple 106 is connected to the hose 12 so that exhaust gas collected from the tailpipe 8 is conducted through the pipe-T 102 to the inlet port 90 of the pump 62.

The pump 62 described above is commercially available, and, hence, its structure need not be described in further detail. When the helical rotor 94 is turned within the double-helical pump cavity 92 by the motor 58, cavities will be formed which will move progressively from the inlet port 90 to the outlet chamber 68. The traveling cavities will have constant volumes, and as each is formed at the inlet port 90, water and exhaust gas will be drawn thereinto in the ratio of 1 to 4 and will be mixed and transmitted to the outlet chamber 68.

Figure 5:
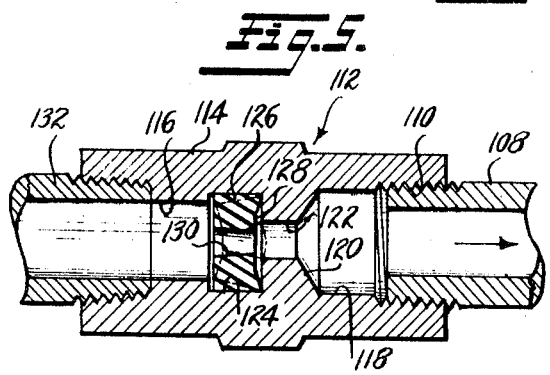
FIG. 5 is an enlarged fragmentary vertical sectional view through a valve which controls the rate of flow of water to the water-gas mixing pump inlet, taken on the line 5–5 of FIG. 3.

The stem of the pipe-T 102 is connected by a nipple 108 to the outlet 110 of a flow control valve 112, best shown in FIG. 5. The valve 112 is commercially available, and includes a cylindrical body 114 having an inlet chamber 116 and an enlarged outlet chamber 118. A wall 120 divides the chambers 116 and 118, and has an axial passage 122 extending therethrough. An enlarged cylindrical cavity 124 is formed within the body 114 on the inlet side of the wall 120.

Received within the cavity 124 is a resilient disc 126, shown in full lines in FIG. 5 in its normal, relaxed condition. The disc 126 has a recess 128 in the face thereof which confronts the wall 120, and has an axial orifice 130 extending therethrough that tapers inwardly from the inlet chamber 116 toward the passage 122. The largest diameter of the tapered orifice 130 is smaller than the diameter of the passage 122. In operation, liquid under pressure enters the inlet chamber 116, causing the resilient body 126 to deform to the shape indicated by the phantom lines in FIG. 5. As the resilient body 126 deforms, the diameter of the orifice 130 is varied inversely in proportion to the value of the fluid pressure. The varying diameter of the orifice 130 thus controls the rate of flow from the inlet chamber 116 to the outlet chamber 118, whereby the valve 112, over its designed operating range, will provide a substantially constant flow through the outlet port 110, regardless of inlet pressure.

The inlet chamber 116 of the flow control valve 112 is connected by a nipple 132, FIG. 3, to the outlet of a solenoid-operated valve 134. A pipe 136 is connected to the inlet of the solenoid valve 134, and extends through an opening in the end wall 28 of the housing 24. An elbow 138 connects the pipe 136 to the water supply pipe 14. The pump 62 is capable of pumping about five times the volume of water that the flow rate control valve 112 will pass, say about one-fourth gallon per minute.

It will be seen that when the solenoid valve 134 is open, water will be supplied through the pipe-T 102 to the inlet port 90 of the pump 62, along with exhaust gas supplied to the pump through the sampling gun 10 and the hose 12. The flow rate of the water to the pump inlet is maintained substantially constant by the flow control valve 112, so that water is supplied at a ratio of about 1 volume of water to 4 volumes of exhaust gas, as stated above. Thus, the positive displacement pump 62 is simultaneously supplied with exhaust gas and water, normally in the ratio of 4 volumes of gas to 1 volume of water, the two being thoroughly mixed while being pumped through the pump. Ordinary tap water will normally be employed, which has a temperature range of about 50° to 80° F.

The combining and pumping of the water with the exhaust gas, which can range in temperature from a few degrees above ambient to about 1200° F., or beyond, results in cooling of the exhaust gas to a substantially uniform temperature near that of the water. In addition to being cooled thereby, the exhaust gas is also washed by the water, so that solid contaminants, such as carbon particles, engine deposits, and the like, are entrained in the water. The water supplied to the pump 62 also functions to lubricate the pump, thus avoiding the necessity of employing lubricating oils, which would cause contamination of the exhaust gas sample and result in a false reading of the air-to-fuel ratio. The positive displacement pump unit 56 insures that exhaust gas will be withdrawn from the tailpipe 8 at a uniform rate regardless of the velocity pressure within said tailpipe, which pressure can vary widely from about 0.1 inch water gauge at idle conditions to about 15.0 inches water gauge, and beyond, at full throttle.

The sampling gun 10 is designed to cooperate with the pump unit 56 to collect the exhaust gas sample in a manner to avoid as much as possible the picking up of carbon particles, moisture, and other contaminants from the tailpipe 8.

Referring to FIGS. 14—17, the sampling gun 10 includes a tubular body 140 comprising an intermediate portion 142, a downwardly inclined nose 144, and an elbow-shaped outer end 146, which is connected to the hose 12. The nose 144 is inclined from the intermediate portion 142 at an angle of about 20°, and is closed at its forward end by a conical tip 148. The tip 148 is welded to the nose portion 144, and has a cylindrical collar 150 on its rear end of a diameter substantially larger than the outer diameter of the nose 142. About midway of the length of the nose 144 there is welded a collar 152 having a diameter equal to that of the collar 150. Between the collars 150 and 152, the nose 144 has a plurality of axially and circumferentially spaced slots 154, which are rearwardly inclined at an angle of about 45° relative to the longitudinal axis of the nose 144.

Near the outer end of the intermediate portion 142, and just inwardly of the elbow 146, is a pair of axially spaced collars 156. The collars 156 are welded to the intermediate portion 142, and a ring 158 is rotatably mounted on said intermediate portion between the collars. The ring 158 is hexagonal, and has an eccentric bore 160 for receiving the intermediate portion 142 of the body 140. Positioned above the bore 160 is a pair of symmetrically disposed parallel bores 162, within which are received the outer ends of legs 164 of a resilient retaining element 166. A transversely extending countersunk bore 168 intersects one of the bores 162, and contains a setscrew 170 for securing the resilient element 166 in position.

Figure 14:
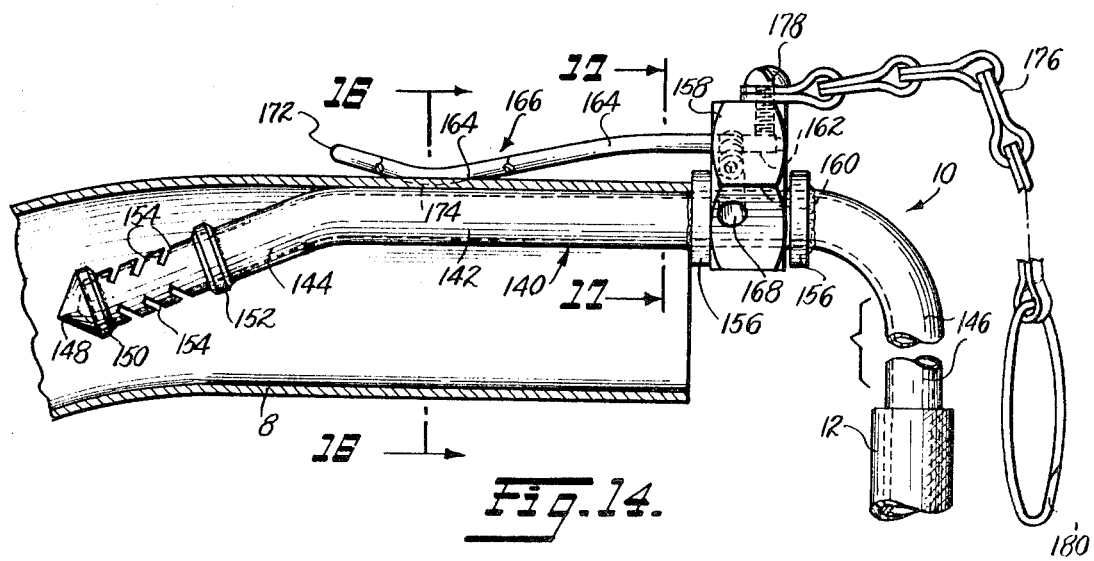
FIG. 14 is an enlarged fragmentary side elevational view of the exhaust gas sampling gun or collecting probe of FIG. 1 shown inserted in an engine exhaust pipe.
Figure 15:
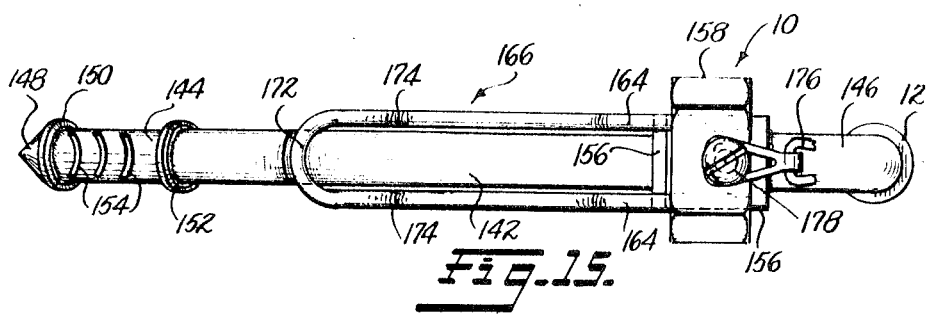
FIG. 15 is a plan view of the sampling gun of FIG. 14, removed from the engine exhaust pipe.
Figure 17:
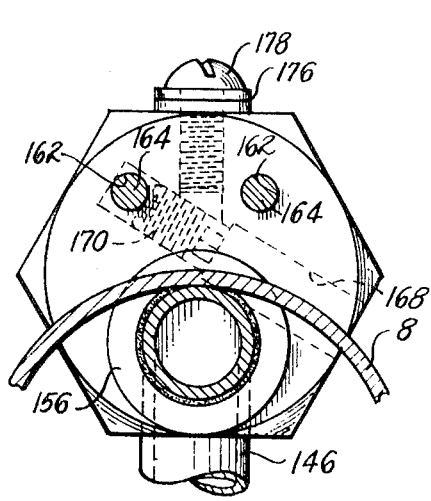
FIG. 17 is an enlarged vertical sectional view, taken on the line 17–17 of FIG. 14.
Figure 16:
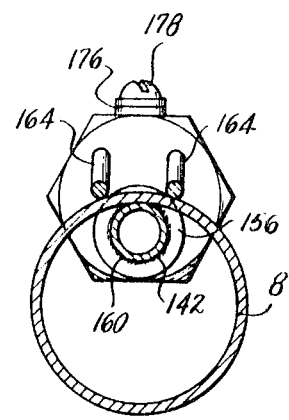
FIG. 16 is a vertical sectional view, taken on the line 16–16 of FIG. 14.

The resilient element 166 is generally U-shaped in plan view, as shown in FIG. 15, the legs 164 being connected by a U-bend 172. Referring to FIG. 14, the outer ends of the legs 164 extend horizontally from the ring 158 for about one-third of their length, where they are bent downwardly. Adjacent the U-bend 172 the legs 164 are again bent upwardly, with the result that downwardly facing crimps 174 are formed just inwardly of the U-bend 172.

The body 140 of the sampling gun 10 is inserted into the tailpipe 8, and the crimps 174 engage the outer surface of said tailpipe to retain the device in position. The collars 150 and 152 insure that the edges of the slots 154 will not scrape against the inner wall surface of the tailpipe during insertion of the body 140, and the conical tip 148 functions to guide the body during insertion, and to guide the flow of exhaust gases over the slotted nose 144. The 20° inclination of the nose 144 relative to the intermediate portions 142 insures that the slots 154 will be exposed within the central, open portion of the tailpipe 8, and the rearward inclination of the slots 154 tend to prevent the entry into the body 140 of particles of carbon and the like entrained in the exhaust gas. Thus, the sampling gun 10 will collect exhaust gas as free as possible of contaminants.

The sampling gun 10 can become quite hot when in use. To facilitate removal thereof without injury to an operator, one end of a chain 176 is secured to the ring 158 by a screw 178. A ring 180 is carried by the free end of the chain 176, and thus the sampling gun 10 can be removed from the tailpipe 8 merely by grasping the ring 180 and pulling on the chain 176.

The sampling gun 10 is the subject matter of a separate application of Leland P. Tinkham and Carl J. Asmus, filed of even date.

Referring to FIGS. 4 and 6, the pump outlet port 80 has a nipple 182 connected thereto, which leads upwardly and is connected to an elbow 184. A nipple 186 is connected to the elbow 184, and extends horizontally to the inlet of a liquid-gas separator 188, the nipples 182 and 186 and the elbow 184 furnishing the structural support for said separator. The construction of the separator 188 is best shown in FIGS. 7 and 8, and includes a generally cylindrical body 190 having an annular flange 192 at its lower end. An annular lip 194 projects downwardly from the inner edge of the flange 192, and carries a seal 196 in an annular groove on the outer periphery thereof.

Fitted over the lip 194 is a separator bowl 198 having an annular flange 200 at its upper end. The bowl 198 is secured in position by a band clamp 202, which engages the flanges 192 and 200. The bowl 198 has a centrally disposed outlet 204 in the bottom wall thereof.

The body 190 includes a central gas outlet chamber 206, which is partially surrounded by an annular gas-water inlet mixture chamber 208, the chambers 206 and 208 being separated by a wall 210 which extends for about two-thirds the height of the body 190. A boss 212 extends across the inlet chamber 208 on one side of the body 190, and has an outlet port 214 extending therethrough. A threaded inlet port 216 in the body 190 opposite the outlet port 214 communicates with the inlet chamber 208, the nipple 186 being threaded into said inlet port.

The lower outer edge of the inlet chamber wall 210 has an annular notch 218 therein, within which is seated the inturned annular flange 220 on the upper end of a frustoconical member 222. The member 222 has vanes 224 formed on the lower edge thereof, which are arranged to impart circular or swirling motion to a liquid-gas mixture as it flows under pressure downwardly thereover from the inlet chamber 208. Nested within the member 222 is a second frustoconical member 226, having an inturned flange 228 on its upper end, which seats on the flange 220. The member 226 has a substantially greater height than the member 222, and terminates at its lower end in an outwardly directed flange 230.

The upper wall of the outlet chamber 206 has a boss 232 provided with a bore 234, within which is secured the splined upper end 236 of a bolt 238. The bolt 238 extends downwardly into the bowl 198, and a spider 240 is received thereon and engages the lower face of the flange 228. A sleeve 242 is received on the bolt 238 below the spider 240, and a washer 244 and nut 246 hold the sleeve 242, the spider 240, and the members 226 and 222 in assembled relationship.

An elbow 248, FIGS. 4 and 7, is connected to the outlet 204 of the bowl 198, and has one end of a flexible tube 250 connected thereto. The end wall 28 of the housing 24 has a fitting 252 mounted thereon and positioned at about one-third the height of the bowl 198. The tube 250 is connected to one end of the fitting 252, and a 45° elbow 254 is connected to the external end of said fitting. A hose 256 is connected to the downwardly facing outlet of the elbow 254, and leads downwardly to a suitable drain. The top portion of the elbow 254 has a vent hole 258 therethrough, which functions to prevent any siphoning action which might occur in the tube 250 leading from the liquid outlet 204 of the bowl 198.

In operation, the exhaust gas-water mixture flowing under pressure from the pump outlet port 80 enters the mixture inlet chamber 208 of the separator 188, and flows downwardly over the vanes 224. The vanes 224 cause the mixture to flow circumferentially around the inner wall of the bowl 198 at high velocity, and the exhaust gas is separated by centrifugal action from the water and from any solid contaminants entrained within the water. The resultant cooled and washed exhaust gas sample then flows upwardly into the exhaust gas outlet chamber 206, and through the outlet port 214. The water and the contaminants entrained therein flow downwardly by gravity to drain through the outlet 204, the flexible tube 250, and the hose 256. The gravity-operated assembly for draining the bowl 198 is designed to place no back pressure on the outlet 204, and the bowl 198 is maintained about one-third full of water by the elevation of the fitting 252 to insure proper operation of the separator 188.

Figure 11:
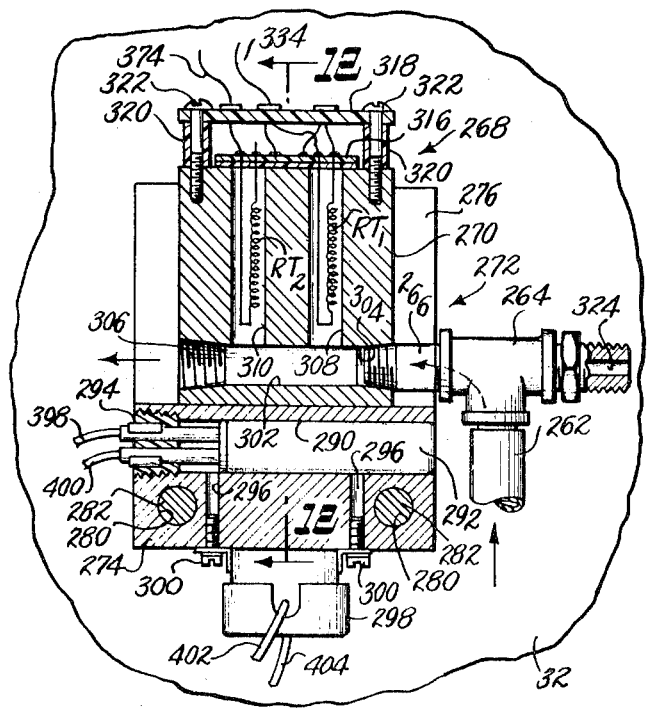
FIG. 11 is an enlarged fragmentary vertical sectional view through the sensing cell of the exhaust gas analyzer, and an electric heater associated therewith.
Figure 12:
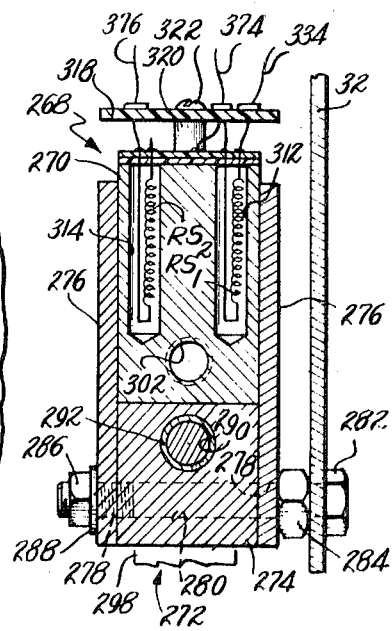
FIG. 12 is a fragmentary vertical sectional view, taken on the line 12–12 of FIG. 11.

An elbow 260, FIG. 4, is connected to the separator exhaust gas outlet port 214, and has one end of a flexible hose 262 connected thereto. The other end of the hose 262 is connected to the vertical stem of a pipe-T 264. One of the horizontal ends of the pipe-T 264 is connected by a nipple 266 to the inlet of a sensing unit 268, the construction of which is best shown in FIGS. 11 and 12.

The sensing unit 268 includes a rectangular cell block 270 preferably made from aluminum or some other material that will readily conduct heat. The cell block 270 is supported by a bracket 272, which is also made from aluminum. The bracket 272 includes a rectangular base block 274 having the same thickness as the cell block 270, but which is somewhat longer than the cell block. The cell block 270 rests upon the top surface of the base block 274, and an aluminum plate 276 is positioned on opposite sides of the base block 274 and extends upwardly to nearly the height of the cell block 270. The plates 276 correspond in width to the length of the base block 274, and the plates 276 and the base block 274 have aligned openings 278 and 280, respectively. A pair of bolts 282 pass through holes in the rear wall 32 of the housing 24 and extend through the aligned openings 278 and 280. A spacer nut 284 is received on each bolt 282 between the wall 32 and the adjacent plate 276 of the sensing unit 268. The unit 268 is secured in position by nuts and washers 286 and 288 on the bolts 282.

The base block 274 has an axial passage 290 extending therethrough positioned to lie just below the top surface of said block. An electrical heating element 292 is disposed in the bore 290 and is secured in position by a threaded bushing 294. The bottom wall of the base block 274 has a pair of threaded holes 296 which intersect the passage 290. A thermostat switch 298 is secured against the bottom face of said base block 274 by screws 300, which are threaded into the holes 296. The heating element 292 and the switch 298 function to maintain the cell block 290 at a uniform temperature sufficiently high to prevent condensation from occurring within the test block 270 while the exhaust gas sample is passing therethrough. The block temperature is preferably about 40° F. higher than the expected temperature of the water supplied to the pump 62.

The test cell block 270 has a longitudinal passage 302 extending therethrough near its lower end, the inlet and outlet ends 304 and 306, respectively, of which are threaded. A first pair of axially aligned, vertically extending test chambers 308 and 310 is provided in the cell block 270 and open at their lower ends into the passage 302 for receiving exhaust gas therefrom. A second pair of transversely aligned, vertically extending chambers 312 and 314 is formed in the cell block 270, said chambers being closed at their lower end. The upper end of each of the chambers 308, 310, 312 and 314 is sealed by dielectric material 316 secured to the top face of the cell block 270.

A terminal plate 318 is supported above the cell block 270 on a pair of spacers 320 made from a dielectric material, the plate 318 and the spacers 320 being secured in position by screws 322. The two chambers 312 and 314 have air, or some inert gas, sealed therein, and respectively contain resistance elements $RS_1$ and $RS_2$. The test chambers 308 and 310, respectively, contain resistance elements $RT_1$ and $RT_2$. The terminals of the four resistance elements extend through the dielectric material 316, and are connected to the terminal plate 318. It is to be understood that current is supplied to the resistances $RS_1$, $RS_2$, $RT_1$ and $RT_2$ when the test cell 270 is in use, so that said resistances are normally heated sufficiently to cause them to glow.

The nipple 266 connects one end of the pipe-T 264 to the inlet 304 of the passage 302, and the outlet 306 of said passage is left open and unobstructed. Thus, a continuous stream of cleaned and cooled gas from the conduit 262 leading from the gas outlet of the separator unit 188 will flow through the passage 302 and up into the passages 308 and 310 and out the outlet 306, with no back pressure on the outlet 306.

The other leg of the T-fitting 264, FIG. 11, has an orifice fitting 324 threaded therein. The pump 62 will continually supply exhaust gas through the conduit 262 at a rate of flow greater than can be accommodated through the passage 302. This high rate of flow is desirable, in that it insures prompt response of the sensing cell 268 to changes in operating conditions of the engine carburetor. The excess amount of exhaust gas supplied through the conduit 262 is exhausted to the atmosphere through the orifice 324, which is always open so that there is no back pressure thereon. The positive displacement pump 62 supplies exhaust gas at a constant rate of flow, and at constant pressure, to the test cell 268, thus eliminating possible error that might occur in the meter readings if there were varying flow rate conditions.

When the cooled and washed exhaust gas leaves the separator 188, it contains some moisture and if the cell block 270 should happen to be sufficiently cool, condensation could result within the test chambers 308 and 310 and destroy the accuracy of the air-to-fuel reading of the gas analyzer, which would be intolerable. The heating element 292 functions to avoid such condition and to maintain the temperature of the cell block 270 sufficiently high, as has been explained, so that no condensation will result when the exhaust gas enters the test chambers 308 and 310. Further, the thermostat switch 298 functions to maintain the cell block 270 at a substantially constant temperature, which also contributes to reliability of the exhaust gas analyzer, in that the only variable then is the thermal conductivity of the exhaust gas.

Figure 18:
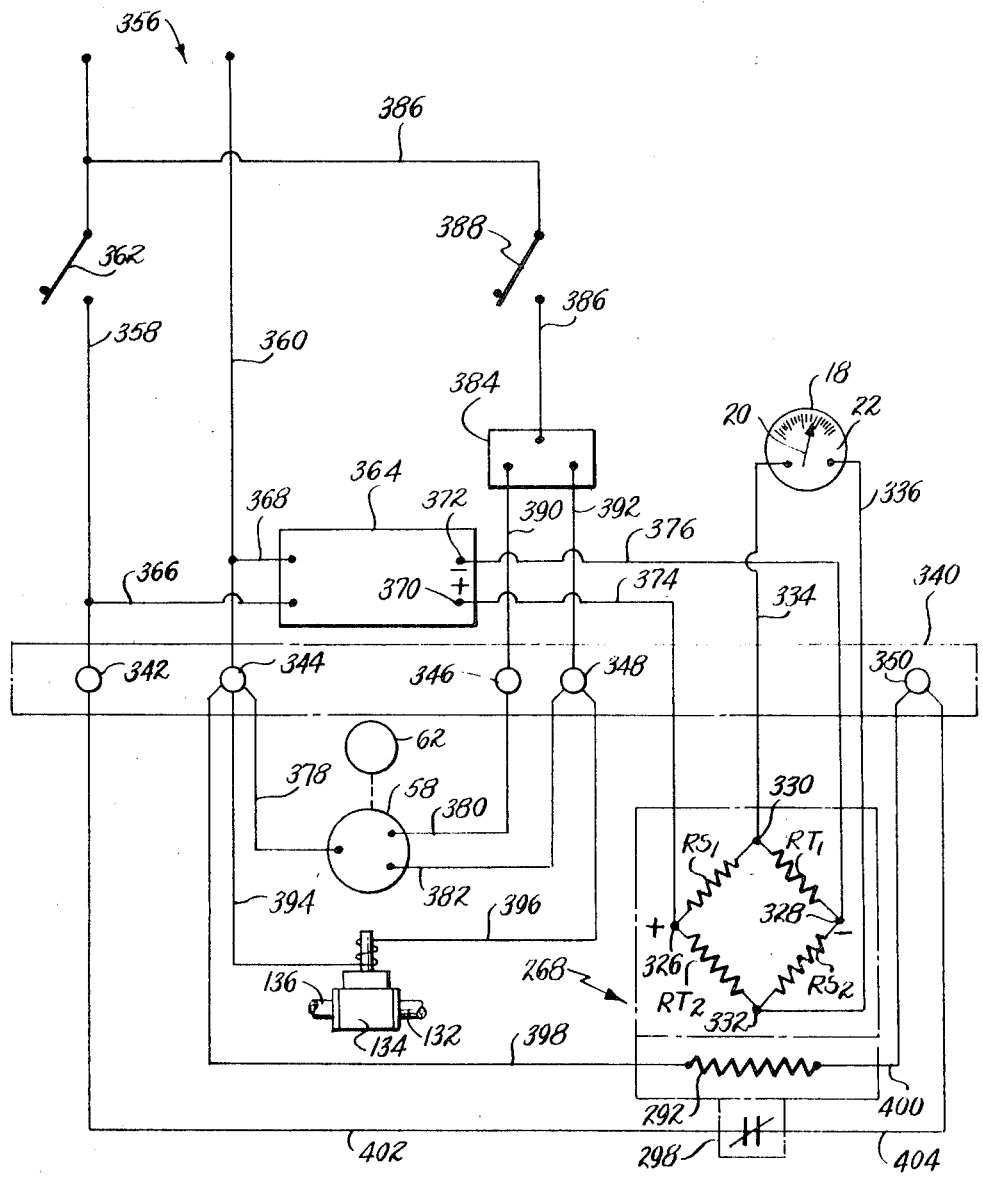
FIG. 18 is a schematic wiring diagram particularly showing the electrical circuit for the test cell of the exhaust gas analyzer.

FIG. 18 is a schematic wiring diagram of the electrical system of the analyzer apparatus and shows four resistance elements $RS_1$, $RS_2$, $RT_1$ and $RT_2$ connected in a wheatstone bridge circuit arrangement, wherein the elements $RS_1$ and $RS_2$, which are disposed in the sealed, air-containing chambers 312 and 314, function as the standard resistances. The resistance elements $RT_1$ and $RT_2$ are exposed to the exhaust gases within the test chambers 308 and 310, and the value of their resistances will vary in accordance with the thermal conductivity of the exhaust gas. The absence of foreign matter in the gas being analyzed prevents fouling of the resistances $RT_1$ and $RT_2$.

The thermal conductivity of engine exhaust gas bears a definite relation to the air-to-fuel ratio of the combustion mixture, it being known that an air-to-fuel ratio of about 13 to 1 by volume in a combustion mixture will result in exhaust gas having a thermal conductivity corresponding to that of air. Thus, when the air-to-fuel ratio of the combustion mixture is 13 to 1, the thermal conductivity within all four chambers 308, 310, 312 and 314 will be substantially identical. The scale 22 of the meter 18 is calibrated on this basis.

When the air-to-fuel ratio increases beyond 13 to 1, the thermal conductivity value of the exhaust gas will decrease below that of air. Thus, the rate of transfer of heat away from the resistance elements $RT_1$ and $RT_2$ will decrease, resulting in a consequent rise in the resistance values of these elements. Contrawise, when the air-to-fuel ratio is less than 13 to 1, the thermal conductivity of the exhaust gas increases above that of air, and the resistance elements $RT_1$ and $RT_2$ will suffer a decrease in operating temperatures, resulting in lower resistance values therefor.

The resistance elements $RS_1$ and $RT_1$ are arranged in series in the upper leg of a wheatstone bridge, whereas the elements $RT_2$ and $RS_2$ are arranged in series in the lower leg of said bridge, moving from the positive terminal 326 to the negative terminal 328 of the bridge. Terminals 330 and 332 are connected to the midpoints of the upper and lower legs, respectively, of the wheatstone bridge, and leads 334 and 336 extend therefrom to the meter 18. The two standard resistances, $RS_1$ and $RS_2$, are sealed in air and will have the same values. The two resistances, $RT_1$ and $RT_2$, are simultaneously exposed to the exhaust gas, and hence have substantially identical resistance values, depending upon the air-to-fuel ratio of the exhaust gas present in the cells. It is thus readily seen that when a DC power supply is connected across the terminals 326 and 328, the wheatstone bridge arrangement will measure the resistances $RT_1$ and $RT_2$, the values of which will be indicated on the meter 18.

As described above, the scale 22 of the meter 18, rather than being calibrated in terms of resistance value, is calibrated to directly indicate air-to-fuel ratio, and shows a range of from 9 to 15. Initial calibration of the meter 18 is done in the usual manner, by passing gases of known thermal conductivity through the cell block 270.

Secured to the backwall 32 of the housing 24 by screws 338 is a terminal strip 340. As shown in FIG. 18, the terminal strip 340 has terminals 342, 344, 346, 348 and 350 thereon. The sidewall 28 of the housing has a fitting 352 thereon, through which extends a cable 354, including several leads for the analyzer unit 2. The analyzer 2 is supplied from an AC power source 356 by a pair of leads 358 and 360, which are connected to the terminals 342 and 344, respectively. The lead 358 includes a switch 362 therein, which, as will be described, controls the supply of electrical current to the heating element 292.

The wheatstone bridge arrangement is supplied with current from a DC power source 364, which is connected to the leads 358 and 360 by leads 366 and 368. The DC power source 364 takes AC current from the leads 358 and 360, and converts it into DC current. The source 364 includes plus and minus terminals 370 and 372, which are connected to the corresponding plus and minus terminals of the wheatstone bridge by leads 374 and 376, respectively.

One side of the pump motor 58 is connected to the terminal 344 by a lead 378. A pair of leads 380 and 382 connect the other side of the motor 58 to the terminals 346 and 348, respectively. A motor-starting relay 384 is connected by a lead 386 to the power lead 358 in advance of the switch 362, the lead 386 having a motor control switch 388 positioned therein. A pair of leads 390 and 392 connects the relay 384 to the terminals 346 and 348. Thus, closing of the switch 388 will result in starting of the motor 58, which motor will in turn operate the positive displacement pump 62.

The solenoid valve 134 includes leads 394 and 396, which connect the same across the terminals 344 and 348. Thus, when the motor control switch 388 is closed, the solenoid valve 134 will be energized to open and supply water to the pump 62.

The heating element 292 has leads 398 and 400 connected thereto, which extend to the terminals 344 and 350, respectively. The thermostatic switch 298 includes leads 402 and 404 that extend to the terminals 342 and 350, respectively. Thus, when the switch 362 is closed, a circuit is established through leads 358 and 402 to the switch 298, from the switch 298 through leads 404 and 400 to the heating element 292, and thence through lead 398 to the power lead 360. The switch 362 thus controls the operations of both the heating element 292 and the thermostatic switch 298.

The invention thus provides a sensing cell 268 which will remain at a constant temperature sufficiently high to avoid condensation within the cell, and which is effective to readily and accurately measure any variations in the air-to-fuel ratio of a carburetor mixture as reflected by the thermal conductivity of the engine exhaust gas. Further, the invention includes apparatus for pretreating or conditioning the exhaust gas before it is supplied to the sensing cell, which conditioning apparatus functions to continuously collect exhaust gas, to cool and wash the same, to separate the exhaust gas sample from the water and contaminants contained in the water, and to supply the cleaned and cooled exhaust gas sample at a constant, relatively high rate of flow to the test cell. The preconditioning of the exhaust gas in advance of measuring its thermal conductivity is an extremely important feature of the invention.

According to the steps of the method of the invention, a sample of exhaust gas is continuously collected by the sampling gun 10 from an engine exhaust tailpipe 8 while the engine is being operated under various conditions of speed and load on the dynamometer rolls 7. The collected sample of exhaust gas is then mixed with water while being forced through the pump 62 to cool the sample to a desired uniform temperature, and to wash solid contaminants therefrom. The washed and cooled gas sample is then separated from the water and from contaminants entrained in the water by passing it through the separator 188, and is then continuously delivered at a uniform rate to the heated air-to-fuel test cell 270. Within the cell, the cooled and washed exhaust gas sample is passed over the wheatstone-bridge-connected, glowing, resistance elements $RT_1$ and $RT_2$ at a constant rate of flow, so that the thermal conductivity of the exhaust gas is continuously measured. From this thermal conductivity, the air-to-fuel ratio of the carburetor mixture is readily determined, and is indicated directly on the meter 18. Every engine has a specified air-to-fuel ratio for optimum operation. If the meter 18 shows a deviation from the optimum ratio, then adjustment, cleaning or overhaul of the carburetor is required.

The invention may be employed either on an intermittent or a continuous basis, and will furnish substantially instantaneous reliable results in either instance. Further, it is readily seen that only minimal operator skill is required, the principal task being to position the sampling gun 10 in the open end of the tailpipe 8. With minimal care, the apparatus will operate indefinitely without impairment by contaminants or condensation.

It is thus seen that the present apparatus and method fulfills all of the objects set forth hereinabove. Obviously, many modifications and variations of the invention are possible in the light of the above teachings. It is therefore to be understood that within the scope of the following claims, the invention may be practiced otherwise than as specifically described.

I claim:

1. The method of analyzing a sample of engine exhaust gas, comprising the steps of: continuously collecting a sample of exhaust gas from an engine exhaust gas system while the engine is being operated; continuously mixing a given volume of the collected exhaust gas sample with a predetermined proportion of cooling liquid to reduce its temperature to a substantially lower and uniform value; separating the cooling liquid and solid contaminants from the mixture of the exhaust gas sample and cooling liquid; continuously delivering the so-treated exhaust gas sample at a substantially uniform rate of flow to a measuring zone wherein its thermal conductivity can be measured; and continuously measuring the thermal conductivity of the exhaust gas sample while it is passing through said measuring zone.

2. The method described in claim 1, including the step of applying sufficient heat to the measuring zone to prevent condensation of any moisture that may be present in the exhaust gas sample.

3. The method of preparing a sample of engine exhaust gas for subsequent analysis comprising the steps of: continuously collecting a sample of exhaust gas from an engine exhaust gas system while the engine is being operated; continuously mixing a given volume of the collected sample of exhaust gas with a given volume of tap water to cool said sample to a desired substantially uniform temperature and to wash contaminants therefrom; continuously centrifugally separating the cooled exhaust gas sample from said water and contaminants entrained in said water; and continuously delivering the cooled and washed exhaust gas sample at a substantially uniform rate to a suitable analyzing zone.

4. The method of analyzing a sample of engine exhaust gas, comprising the steps of: continuously collecting a sample of exhaust gas from an engine exhaust gas system while the engine is being operated; continuously mixing about four parts of the collected sample of exhaust gas with about one part by volume of tap water to cool said sample to a desired substantially uniform temperature and to wash contaminants therefrom; continuously centrifugally separating the cooled exhaust gas sample from said water and contaminants entrained in said water; continuously delivering the cooled and washed exhaust gas sample at a substantially uniform rate to a zone wherein its thermal conductivity can be measured; and continuously measuring the thermal conductivity of the exhaust gas sample while it is passing through said measuring zone to ascertain its original air-to-fuel ratio.

5. The method as described in claim 4, wherein the step of continuously measuring the thermal conductivity of the exhaust gas sample includes the steps of: passing the exhaust gas sample over an electrically heated resistance means at a substantially uniform rate; and continuously measuring the value of the change in resistance of the resistance means in response to changes, if any, in the thermal conductivity of the exhaust gas passing thereover.

6. Apparatus for preparing a sample of engine exhaust gas for subsequent analysis, comprising: means for continuously collecting a sample stream of exhaust gas from an engine exhaust gas system while the engine is being operated; means connected with said collecting means for continuously and thoroughly mixing the collected stream of exhaust gas with a stream of water to cool said exhaust gas to a desired substantially uniform temperature and to wash contaminants therefrom; liquid and gas separator means connected with said combining means for separating the cooled exhaust gas from the water and contaminants entrained in said water; and means connected with said separating means for continuously delivering the cooled and washed exhaust gas to a measuring zone.

7. Apparatus for determining the performance of an engine by analyzing its combustion mixture, comprising: means for measuring the thermal conductivity of an exhaust gas sample collected from an engine and for indicating therefrom the air-to-fuel ratio of the combustion mixture; means for collecting said exhaust gas sample; treating means connecting said collecting means with said measuring means comprising a pump having a mixing chamber for simultaneously receiving the exhaust gas sample and cooling water, and including means to thoroughly mix the two to cool the exhaust gas sample and to entrain contaminants therefrom, centrifuge means for separating the contaminated water from the exhaust gas sample; and means connected with said centrifuge means to supply the cooled and decontaminate exhaust gas sample at a substantially uniform rate to said measuring means.

8. Apparatus as recited in claim 7, wherein the measuring means includes: a cell block having an inlet, an outlet, a passage extending between said inlet and outlet, a first pair of chambers in communication with said passage to receive exhaust gas therefrom, and a second pair of sealed chambers containing a standard gas, said inlet being connected with said centrifuge means; a power supply; an electrical resistance element disposed in each of said chambers; and meter means, said power supply, meter means, and resistance elements being connected in an electrical circuit to form a wheatstone bridge for measuring the thermal conductivity of exhaust gas in said first pair of chambers, said meter means being arranged in said circuit and calibrated to indicate the air-to-fuel ratio of a carburetion mixture corresponding to the measured thermal conductivity.

9. Apparatus as recited in claim 8, including thermostatically controlled heater means arranged to maintain the cell block at a substantially constant preselected temperature higher than the temperature of the exhaust gas sample being analyzed.

10. Apparatus as recited in claim 7, wherein the treating means includes: a positive displacement pump having an inlet and an outlet, said collecting means being connected with said pump inlet; means connected to said pump inlet for delivering water thereto at a predetermined uniform flow rate simultaneously with the delivery of exhaust gas to said pump inlet for admixture with the collected exhaust gas sample during pumping by said pump, to cool the exhaust gas sample and to wash contaminants therefrom; and a gas-liquid separator having an inlet connected with said pump outlet and operable to separate said exhaust gas from said water and contaminants entrained in said water, to provide a cooled and washed exhaust gas sample, said separator having a first outlet connected to said measuring means for delivering said cooled and washed exhaust gas sample thereto, and a second outlet for said contaminated water.

11. Apparatus for continuously measuring the air-to-fuel ratio of a carburetor mixture being supplied to an internal combustion engine, by analyzing the exhaust gas resulting from the operation of said engine and measuring its thermal conductivity, comprising: means for continuously collecting an exhaust gas sample from the engine exhaust gas system; means connected with said collecting means for continuously combining and thoroughly mixing the collected exhaust gas sample with water to cool said sample to a desired uniform temperature and to wash said exhaust gas sample by entraining in the water any contaminating solids present in said exhaust gas sample; means connected with said combining means for continuously centrifugally separating the cooled exhaust gas sample from the water and contaminating solids entrained in said water; measuring means for continuously analyzing said cooled and washed exhaust gas sample to measure the thermal conductivity thereof, including means for indicating the air-to-fuel ratio of the carburetor mixture as reflected by the thermal conductivity of the exhaust gas; and means connecting said separating means and said analyzing means for delivering the cooled and washed exhaust gas sample to said measuring means at a substantially uniform rate.

12. Apparatus as recited in claim 11, wherein the measuring means includes: electrically heated resistance element means arranged so that the cooled and washed exhaust gas sample passes thereover; and means connected with said resistance element means for measuring the value of the change in resistance of the resistance element means in response to changes, if any, in the thermal conductivity of the exhaust gas sample passing thereover.

13. Apparatus for determining the performance of an engine by analyzing its combustion and measuring the thermal conductivity of the resulting exhaust gas, comprising: a pump having an inlet and an outlet means for collecting a sample of the exhaust gas to be analyzed and delivering the same to said pump inlet; means for delivering water at a predetermined, uniform flow rate to said pump inlet for admixture with the exhaust gas sample during pumping by said pump, to cool said exhaust gas sample and to wash contaminants therefrom; a gas-liquid separator having an inlet connected with said pump outlet, and operable to separate said exhaust gas from said water and contaminants entrained in said water to provide a cooled and washed exhaust gas sample, said separator having one outlet for said cooled and washed exhaust gas sample and a separate outlet for the contaminated water; and means connected with said gas outlet of said separator for analyzing the thermal conductivity of said cooled and washed exhaust gas sample and for indicating therefrom the air-to-fuel ratio of said combustion mixture.

14. Apparatus as recited in claim 13, wherein the analyzing means includes: a cell block having an inlet, an outlet, and a passage extending between said inlet and outlet, said inlet being connected with the gas outlet of the separator; test cell means communicating with said passage, and including electrical means arranged to continuously measure the thermal conductivity of said cooled and washed exhaust gas sample; and meter means connected with said electrical measuring means for indicating from said thermal conductivity the air-to-fuel ratio of the combustion mixture.

15. Apparatus as recited in claim 14, including thermostatically controlled heater means arranged to maintain the cell block at a substantially constant preselected temperature greater than the temperature of the cooled and washed exhaust gas sample.

16. Apparatus for preparing a sample of engine exhaust gas for subsequent analysis, comprising: means for continuously receiving engine exhaust gas and continuously mixing said exhaust gas with a liquid coolant to cool said exhaust gas to a desired substantially uniform temperature and to wash solid contaminants therefrom; and a gas-liquid separator arranged to receive said mixture of exhaust gas and liquid coolant to separate the same, said separator having one outlet for the coolant and contaminants entrained therein and another outlet for the cooled, clean exhaust gas.

17. The method of analyzing a sample of engine exhaust gas, comprising the steps of: continuously collecting a sample of exhaust gas from an engine exhaust gas system while the engine is being operated; continuously mixing the collected exhaust gas sample with a substantially uniform stream of cooling liquid to reduce its temperature to a substantially lower and uniform value; continuously separating the cooling liquid and solid contaminants entrained therein from the mixture of the exhaust gas sample and cooling liquid; and continuously delivering a stream of said cooled and decontaminated exhaust gas sample to suitable analyzing means.

18. The method recited in claim 17 including the steps of delivering to the analyzing means the stream of exhaust gas sample at a substantially uniform rate of flow; and heating the delivered stream of exhaust gas sample to a temperature above the condensation point of any vapor present in said exhaust gas sample.

19. Apparatus for preparing a sample of engine exhaust gas for subsequent analysis, comprising: means for continuously collecting a sample of exhaust gas from an engine exhaust gas system while the engine is being operated; means connected with said collecting means for continuously combining and thoroughly mixing the collected exhaust gas with water to cool said exhaust gas to a desired substantially uniform temperature and to wash contaminants therefrom, said exhaust gas and water combining means including a positive displacement pump having an inlet and an outlet; means connecting said exhaust gas collecting means with the pump inlet; means connected with said pump inlet for continuously delivering water thereto at a predetermined uniform flow rate simultaneously with the delivery of exhaust gas to said pump inlet; liquid and gas separator means connected with said combining means for separating the cooled exhaust gas from the water and contaminants entrained in said water; and means connected with said separating means for continuously delivering the cooled and washed exhaust gas to a measuring zone.

20. Apparatus for measuring the thermal conductivity of an engine exhaust gas sample and for indicating therefrom the air-to-fuel ratio of the engine combustion mixture, comprising: a cell block having formed therein an inlet, an outlet, a passage extending between said inlet and outlet, a first pair of chambers along and in communication with said passage to receive exhaust gas therefrom, and a second pair of sealed chambers containing a standard gas sample; orifice means mounted in the inlet of the cell block to bleed off any excess portion of an exhaust gas sample being supplied to said cell block; an electrical circuit, including a power supply; an electrical resistance element disposed in each of said chambers; meter means; said power supply, said meter means and said resistance elements being connected in said circuit to form a wheatstone bridge for measuring the thermal conductivity of exhaust gas entering said first pair of chambers, said meter means being arranged and calibrated to indicate the air-to-fuel ratio of a combustion mixture corresponding to the measured thermal conductivity; and thermostatically controlled heater means arranged to maintain the cell block at a substantially constant preselected temperature greater than the temperature of the exhaust gas sample being analyzed.

PO-1050
(5/69)

UNITED STATES PATENT OFFICE
CERTIFICATE OF CORRECTION

Patent No. 3,581,555          Dated June 1, 1971

Inventor(s) Edwin L. Cline

It is certified that error appears in the above-identified patent and that said Letters Patent are hereby corrected as shown below:

Column 11, line 47,
    "decontaminate" should read --decontaminated--

Column 14, line 24,
    The semicolon (;) should be a comma (,).

Signed and sealed this 2nd day of November 1971.

(SEAL)
Attest:

EDWARD M. FLETCHER, JR.      ROBERT GOTTSCHALK
Attesting Officer             Acting Commissioner of Patents